Figure 1:
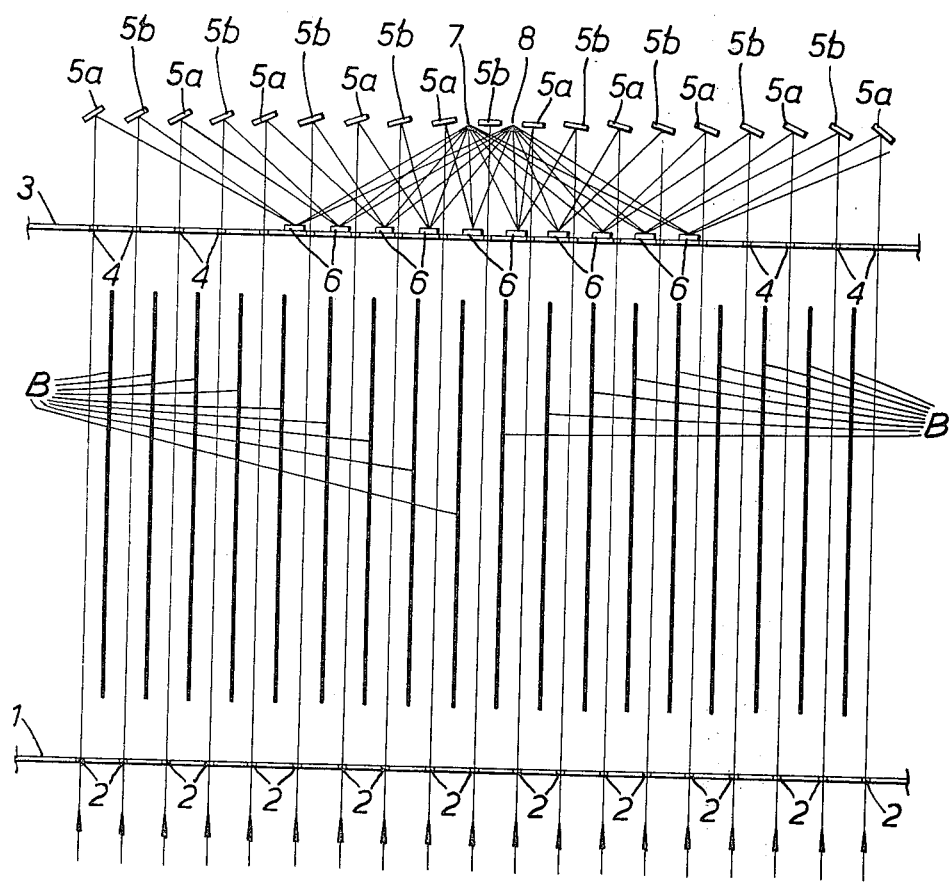

United States Patent [19]
Baxter

[11] 3,902,804

[45] Sept. 2, 1975

[54] OPTICAL VELOCITY MEASURING APPARATUS

[75] Inventor: Ivor Renton Baxter, Shenfield, England

[73] Assignee: The Marconi Company Limited, Chelmsford, England

[22] Filed: Aug. 23, 1973

[21] Appl. No.: 390,793

[30] Foreign Application Priority Data
Aug. 23, 1972  United Kingdom............... 39167/72

[52] U.S. Cl. ............. 356/28; 250/237 G; 350/292; 350/299
[51] Int. Cl.$^2$ .......................................... G01P 3/36
[58] Field of Search ...... 350/292, 299; 356/28, 170, 356/167; 250/237 G

[56] References Cited
UNITED STATES PATENTS

| | | | |
|---|---|---|---|
| 2,136,486 | 11/1938 | Blondin.............................. | 350/292 |
| 2,439,295 | 4/1948 | Hammond et al. ............. | 250/237 R |
| 3,031,351 | 4/1962 | McIlvaine ...................... | 250/237 R |
| 3,059,521 | 10/1962 | Clemens et al. ..................... | 356/28 |

Primary Examiner—Maynard R. Wilbur
Assistant Examiner—S. C. Buczinski
Attorney, Agent, or Firm—Baldwin, Wight & Brown

[57] ABSTRACT

The invention relates to an optical velocity measuring apparatus in which a velocity dependent spectral component of modulation is derived from a photosensitive arrangement receiving spatial reflections of light arising when a moving surface passes an optical grating between it and the photosensitive arrangement. Two screen members, each having a like plurality of apertures are arranged in the field of view of the photosensitive detector arrangement, each of the apertures in the second screen member receiving light through a different one only of the apertures in the first screen member and the light from all of the apertures in the second screen member being directed via individual reflecting elements on to the photosensitive detector arrangement.

9 Claims, 3 Drawing Figures

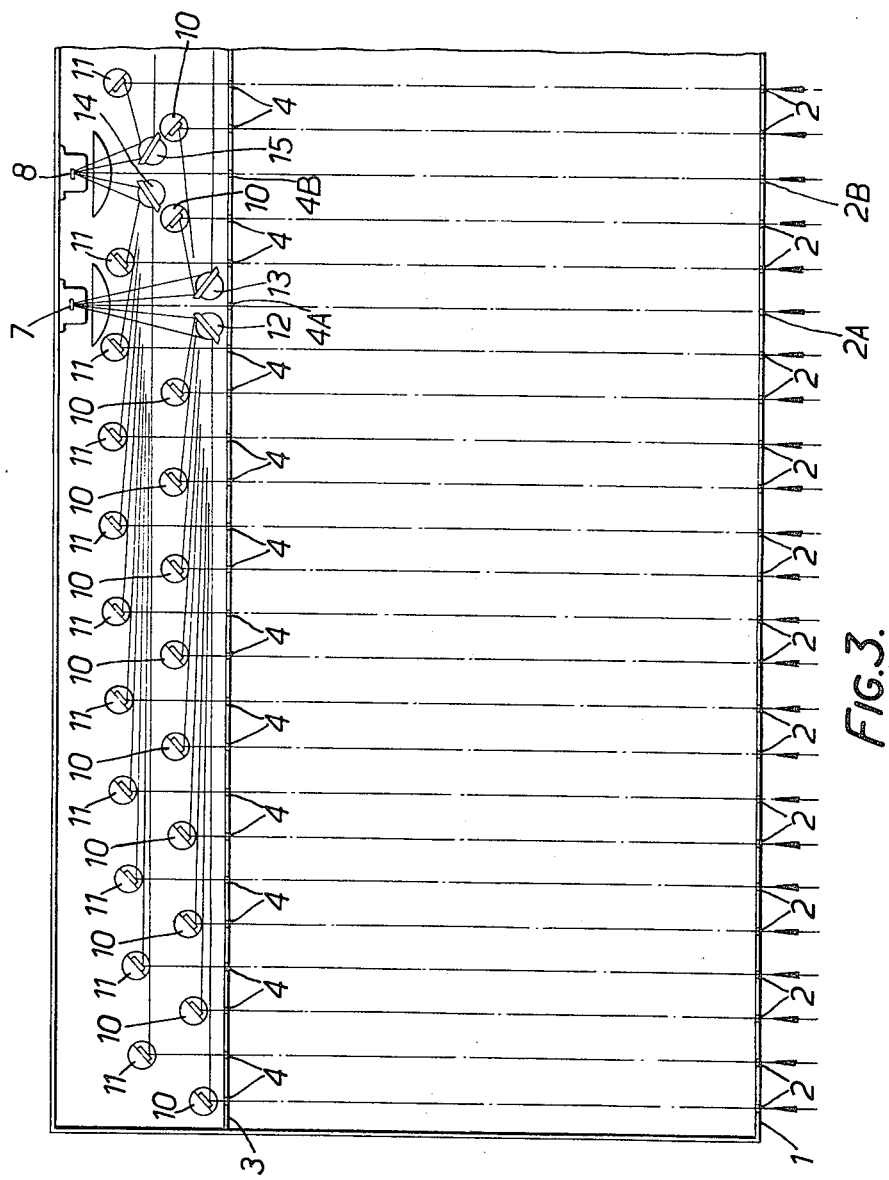

OPTICAL VELOCITY MEASURING APPARATUS

This invention relates to optical velocity measuring apparatus and more particularly to such apparatus in which a velocity dependent spectral component of modulation is derived from a photo-sensitive arrangement receiving spatial reflections of light arising when a moving surface passes an optical grating between it and the photo-sensitive arrangement.

One arrangement of this nature is disclosed in our co-pending U.S. application Ser. No. 300,814. This consists of a plurality of individual reflecting elements each arranged to view a different spaced portion of the line of travel of an object so as to provide an effective optical grating in space along said line, each of the elemental reflecting elements being arranged to focus light received thereby on to a common photo-sensitive arrangement through an aperture associated with the photo-sensitive arrangement.

This apparatus has been found to work very satisfactorily in practice and to exhibit good efficiency in terms of the amount of usable light which is gathered. For the sake of light gathering each elemental reflecting element is provided in the form of a strip mirror whose longer dimension extends perpendicular to the line of travel of an object whose velocity is to be determined. To obtain optimum spatial coherence some care must be taken during assembly to ensure that the individual reflecting elements have a desired spacing one from another which is maintained throughout their lengths. In practice each individual reflecting element in an apparatus is adjusted by hand following final assembly. This is a somewhat time consuming procedure.

The present invention seeks to provide an improved optical velocity measuring apparatus which is such that, whilst it may be of reduced efficiency compared with the apparatus described immediately above, it lends itself to the obtaining of acceptable spatial coherence with relatively less effort.

According to this invention an optical velocity measuring apparatus comprises a first screen member having a plurality of apertures, a second screen member spaced from the first and having a plurality of apertures each of which is arranged to receive light through different ones of the apertures in said first screen and means for directing light passing through the apertures in said second screen to a photo-sensitive detector arrangement.

Preferably the arrangement is such that each of the apertures in said second screen member receives light through a different one only of the apertures in said first screen member. It is, however, possible to arrange for each aperture in said second screen member to receive light through a different plurality of apertures in said first screen member. In either case, care should be taken that no, or an insubstantial amount of, light from an aperture in said first screen member associated with a given aperture in said second screen member, finds its way to any other aperture in said second screen member. Whilst not normally required where each of the apertures in said second screen member receives light through one only of the apertures in the first screen member, baffles may be provided separating the light paths from the apertures in the first screen member to the respective apertures in said second screen member.

Preferably said apertures are narrow slits whose longer dimensions extend perpendicularly to the direction of travel of an object whose velocity is to be determined.

Preferably again said photo-sensitive detector arrangement comprises two photo-sensitive detectors whose outputs, in operation, may be relatively inverted and combined to reduce the effect of spurious signals, said light directing means being such that light from alternate apertures in said second screen member is directed to one photo-sensitive detector, whilst light from the remaining apertures in said screen member is directed to the other photo-sensitive detector.

In one embodiment of the invention said light directing means comprises an array of first individual reflecting elements arranged in a plane spaced from said second screen member and on the side thereof remote from said first screen member, there being one individual reflecting element for each aperture in said second screen member, said first individual reflecting elements being inclined to reflect light received thereby via further individual reflective elements mounted on the surface of said second screen member remote from said first screen member to appropriate ones of said two photo-sensitive detectors.

Preferably again said two photo-sensitive detectors are located in the same plane as said first individual reflecting elements.

Preferably again the arrangement is such that each of said further individual reflecting elements reflects light from two adjacent ones of said first individual reflecting elements, light from one of said two individual reflecting elements being directed to one of said photo-sensitive detectors and light from the other being directed to the other of said two photo-sensitive detectors.

In a second embodiment of the invention said light directing means comprises two arrays of individual reflecting elements each array arranged in a different plane spaced from said second screen member and on the side thereof remote from said first screen member, the individual elements of one array being arranged to receive light from respective ones of said alternate apertures in said second screen member and direct light therefrom onto first common reflective means which in turn is arranged to direct received light onto said one photo-sensitive reflector and the individual elements of the other array being arranged to receive light from respective ones of said remaining apertures in said second screen member and direct light therefrom onto second common reflective means which in turn is arranged to direct received light onto said other photodetector.

Preferably said two photo-detectors lie in a common plane beyond the two planes in which the arrays of individual reflecting elements lie, with reference to said second screen member.

Preferably again each of said two photo-detectors are arranged with the individual reflecting elements of the array from which it receives light disposed on either side thereof and the common reflective means associated therewith comprises two individual reflecting elements one receiving light from the individual reflecting elements in the array to one side of the photo-detector and the other receiving light from the individual reflecting elements in the array to the other side of the photo-detector.

Figure 2:
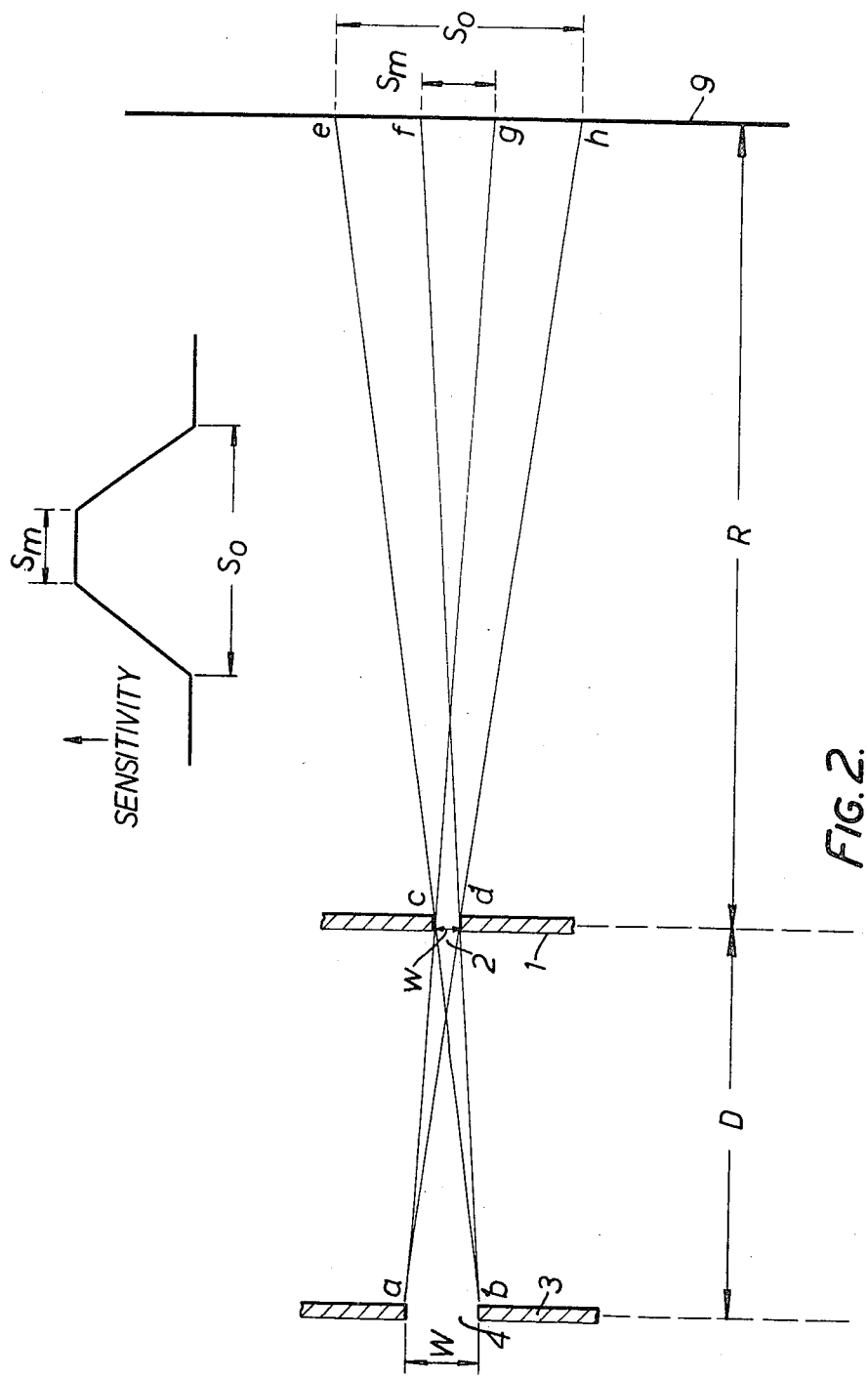

The invention is illustrated in and further described with reference to FIGS. 1 and 2 of the accompany drawings and FIG. 3 of the accompanying drawing which, FIG. 1 is a schematic representation of one embodiment of optical velocity measuring apparatus in accordance with the present invention, FIG. 2 is a geometric diagram used to explain the considerations involved in choosing the dimensions of the slits in the first and second screen members of FIG. 1 and the distance separating the same, and FIG. 3 is a schematic representation of another embodiment of optical velocity measuring apparatus in accordance with the present invention.

In the figures, like references denote like parts.

Referring to FIG. 1 a first screen member 1 consists of a metal sheet having a plurality of apertures 2 therein. The apertures 2 consist of similar narrow slits whose longer dimensions extend perpendicular to the line of travel of an object whose velocity is to be determined, which line of travel is assumed to be in the plane of the drawing.

Spaced from the first screen member 1 is a second screen member 3 which again consists of a metal sheet having a plurality of apertures 4 therein, which are similar in number and greater dimensions to the apertures 2 in the first screen member 1, but, in this instance of greater width.

Screen members 1 and 3 are arranged parallel to one another and with their respective slits 2 and 4 aligned. Positioned to receive light passing through each of the slits 4 from the respective slit 2 is an individual reflecting element 5. The individual reflecting elements 5 lie in a common plane and are inclined to direct light, via further individual reflecting elements 6 provided on the surface of the second screen member 3 which is remote from the screen member 1, on to one or other of two photo-sensitive detectors 7 and 8. The arrangement is such that alternate ones of the individual reflecting elements 5 (i.e. those which bear the subscript $a$) direct light on to one of the photo-sensitive detectors (i.e. 7), whilst the remaining individual reflecting elements 5 (i.e. those which bear the subscript $b$) are arranged to direct light on to the other photo-sensitive detector (i.e. 8). It will be seen that each of the further individual reflecting elements 6 is utilised to reflect light from two adjacent individual reflecting elements $5a$ and $5b$ in the direction of the respective photo-sensitive detectors 7 and 8.

The outputs of the photo-sensitive detectors 7 and 8 are relatively inverted and combined in order to reduce the effects of spurious signals, as known per se. This is not illustrated however.

The quality of the spatial coherence which is obtained with this arrangement depends upon the accuracy with which the slits 2 and 4 are provided in the sheets 1 and 3 which reduce the problem of obtaining optimum spatial coherence to one of mechanical precision in manufacturing and aligning the screen members 1 and 3. Whilst the efficiency in terms of light conversion has been found to be lower than that of a system as described in our co-pending U.S. application Ser. No. 300,814, it is very much simpler to obtain a satisfactory degree of spatial coherence.

Referring now to FIG. 2, part of the first screen member 1 containing one slit 2 and part of the second screen member 3 containing one slit 4 is represented, as is a plane 9 in which an object whose velocity is to be determined is assumed to be travelling (from top to bottom of the drawing as viewed). In FIG. 2, W is the width of the slit 4, $w$ is the width of the slit 2, D is the distance separating the first screen member 1 from the second screen member 3, R is the distance between the plane 9 and the first screen member 1 (chosen with a pre-determined range in mind), $S_m$ is the range embracing maximum sensitivity in the plane 9 extending between $f$ and $g$, $S_o$ is the total range of sensitivity in the plane 9 extending between $e$ and $h$, $c$ and $d$ define the limits of the slit 2 and $a$ and $b$ define the limits of the slit 4.

From triangles $a$, $d$, $b$ and $d$, $f$, $h$ which are similar:

$$ab = W \qquad \text{height of } ab = D$$

$$fh = \frac{S_o}{2} + \frac{S_m}{2} = \frac{(S_o + S_m)}{2}$$

$$\text{Then } \frac{ab}{fh} = \frac{\text{height } adb}{\text{height } dfh}$$

$$\text{or } ab = \frac{fh \cdot \text{height } adb}{\text{height } dfh} \qquad \text{height of } dfh = R$$

$$\text{Hence } W = \frac{(S_o + S_m)D}{2R}$$

From triangles a, c, d, and a, g, h which are similar:

$$cd = w \qquad \text{height of } acd = D$$

$$gh = \frac{S_o - S_m}{2} \text{ and height of } agh = R + D$$

$$\text{Then } cd = \frac{gh \cdot \text{height } acd}{\text{height } agh}$$

$$\text{Hence } w = \frac{(S_o - S_m)D}{2(R+D)}$$

From the above:

$$S_o = \frac{R(W+w) + wd}{D}$$

$$S_m = \frac{R(W+w) - wd}{D}$$

$$R = \frac{(S_m + w)D}{(W - w)} \qquad R = \frac{(S_o + w)D}{(W + w)}$$

If the sensitivity pattern is symmetrical then:
$S_o = S - S_m$
where $S$ is the spatial wavelength Then $W = SD/2R$ $$\text{and } w = \frac{(S - 2S_m)D}{2(R+D)}$$

Referring to FIG. 3, screen members 1 and 3, with slit apertures 2 and 4 are arranged as in FIG. 1 and the same considerations are involved in choosing the dimensions of slit apertures 2 and 4 and the distance separating the same, as are described with reference to FIG. 2.

In the embodiment of FIG. 3, however, two arrays of individual light reflecting elements 10, 11, are provided to receive light from the slit apertures 4. The two arrays of elements 10 and 11 lie in different planes spaced from second screen member 3 and on the side thereof remote from the first screen member 1. In this case also the two photo-detectors 7 and 8 lie in a common plane beyond the two planes in which the arrays of individual reflective elements 10, 11 lie, with reference to second screen member 3. Photo-detector 7 is arranged with the individual reflecting elements 10 disposed on either side thereof whilst photo-detector 8 is arranged with the individual reflecting elements 11 disposed on either side thereof. Not all of the elements 10 and 11, and associated slit apertures 2 and 4 are shown to the right as viewed but it may be taken that an equal number of elements 10, and associated slit apertures 2 and 4 are provided to the right of the photo-detector 7 as are provided to the left of the same. Similarly an equal number of elements 11 and associated slit apertures 2 and 4 are provided to the right of photo-detector 8 as are provided to the left of the same.

Individual reflecting elements 10 are arranged to direct light onto a common reflective means consisting of two individual reflecting elements 12 and 13, element 12 receiving light from the elements 10 to the left of photo-detector 7 and element 13 receiving light from the elements 10 to the right of photo-detector 7.

Similarly, individual reflecting elements 11 are arranged to direct light onto a common reflecting means consisting of two individual reflecting elements 14 and 15, element 14 receiving light from the elements 11 to the left of photo-detector 8 and element 15 receiving light from the elements 11 to the right of photo-detector 8.

Individual reflecting elements 12 and 13 direct light onto photo-detector 7 whilst individual reflecting elements 14 and 15 direct light onto photo-detector 8.

As will be seen, with this particular embodiment, what would be the median individual reflecting element of the array 10 is omitted since the location of photo-detector 7 permits it to receive light through the apertures referenced 2A and 4A without reflection. Similarly what would be the median individual reflecting element of the array 11 is omitted since the location of photo-detector 8 permits it to receive light through the apertures referenced 2B and 4B without reflection.

I claim:

1. Apparatus for measuring relative velocity between the apparatus and an object having a velocity component along a line in a plane containing the object and remote from the apparatus, comprising in combination:
    photo-sensitive means for producing an electrical output signal in response to fluctuation in intensity of light incident thereon;
    reflective means for reflecting light to said photo-sensitive means and comprising a number of spaced, strip-like mirrors arranged with their lengths essentially parallel and oriented to view successive segments along said line, the lengths of said mirrors extending perpendicular to the direction of said line;
    a first screen member having a number of slit-like light transmitting areas, one for each mirror and in which each area is of a selected width W and extends in a direction parallel to its associated mirror, said first screen member being disposed adjacent said mirrors between said plane containing the object and the photo-sensitive and reflective means;
    a second screen member disposed parallel to said first screen member and in closely spaced relation thereto, between said first screen member and said plane containing said object, said second screen member having a number of second slit-like light transmitting areas, one for each of said areas first mentioned and in which each second area is of a selected width w and is aligned with its associated area first mentioned, said width W being greater than said width w and the spacing between said screen members being such that each associated pair of first and second light transmitting areas limits the line segment which may be viewed by the associated mirror, such that the tolerance of mirror mounting to obtain satisfactory spatial coherence is lessened without detracting materially from the light gathering properties of the apparatus.

2. An apparatus as claimed in claim 1 and wherein baffles are provided separating the light paths from the apertures in the first screen member to the respective apertures in said second screen member.

3. An optical velocity measuring apparatus comprising a first screen member having a plurality of apertures, a second screen member spaced from the first and having a plurality of apertures each of which is arranged to receive light through different ones of the apertures in said first screen, wherein said apertures are narrow slits whose longer dimensions extend perpendicularly to the direction of travel of an object whose velocity is to be determined, and means for directing light passing through the apertures in said second screen to a photo-sensitive detector arrangement, and wherein said photo-sensitive detector arrangement comprises two photo-sensitive detectors whose outputs are relatively inverted and combined to reduce the effect of spurious signals, said light directing means being such that light from alternate apertures in said second screen member is directed to one photo-sensitive detector, whilst light from the remaining apertures in said second screen member is directed to the other photo-sensitive detector.

4. An apparatus as claimed in claim 3 and wherein said light directing means comprises an array of first individual reflecting elements arranged in a plane spaced from said second screen member and on the side thereof remote from said first screen member, there being one individual reflecting element for each aperture in said second screen member, said first individual reflecting elements being inclined to reflect light received thereby via further individual reflective elements mounted on the surface of said second screen member remote from said first screen member to appropriate ones of said two photo-sensitive detectors.

5. An apparatus as claimed in claim 3 and wherein said two photo-sensitive detectors are located in the same plane as said first individual reflecting elements.

6. An apparatus as claimed in claim 3 wherein the arrangement is such that each of said further individual reflecting elements reflects light from two adjacent ones of said first individual reflecting elements, light from one of said two adjacent individual reflecting elements being directed to one of said photo-sensitive detectors and light from the other being directed to the other of said two photo-sensitive detectors.

7. An optical velocity measuring apparatus comprising a first screen member having a plurality of apertures, a second screen spaced from the first and having a plurality of apertures each of which is arranged to receive light through different ones of the apertures in said first screen, wherein said apertures are narrow slits whose longer dimensions extend perpendicularly to the direction of travel of an object whose velocity is to be determined, and means for reflecting light passing through the apertures in said second screen to a photosensitive detector arrangement, wherein said light reflecting means comprises two arrays of individual reflecting elements each array spaced from said second screen member and on the side thereof remote from said first screen member, the individual elements of one array being arranged to receive light from respective ones of alternate apertures in said second screen member and direct light therefrom onto first common reflective means which in turn is arranged to direct received light onto a first photo-sensitive detector of said detector arrangement and the individual elements of the other array being arranged to receive light from respective ones of said remaining apertures in said second screen member and direct light therefrom onto second common reflective means which in turn is arranged to direct received light onto a second photo-detector of said detector arrangement.

8. An apparatus as claimed in claim 7 and wherein said two photo-detectors lie in a common plane beyond the two arrays of individual reflecting elements with reference to said second screen member.

9. An apparatus as claimed in claim 7 wherein each of said two photo-detectors are arranged with the individual reflecting elements of the array from which it receives light disposed on both sides thereof and the common reflective means associated therewith comprises two individual reflecting elements one receiving light from the individual reflecting elements in the array to one side of the photo-detector and the other receiving light from the individual reflecting elements in the array to the other side of the photo-detector.

* * * * *